United States Patent [19]
Bette et al.

[11] Patent Number: 5,397,655
[45] Date of Patent: Mar. 14, 1995

[54] FUEL CELL BLOCK AND METHOD FOR ADJUSTING THE REMOVAL OF INERT GAS FROM THE FUEL CELL BLOCK

[75] Inventors: Willi Bette, Erlangen; Josef Lersch, Heroldsbach; Arno Mattejat, Bubenreuth; Karl Strasser, Erlangen, all of Germany

[73] Assignee: Siemens Aktiengesellschaft, Munich, Germany

[21] Appl. No.: 147,794

[22] Filed: Nov. 5, 1993

[30] Foreign Application Priority Data

Nov. 5, 1992 [DE] Germany .............. 42 37 413.8

[51] Int. Cl.$^6$ .................................. H01M 8/04
[52] U.S. Cl. ............................ 429/13; 429/23
[58] Field of Search ............. 429/13, 12, 22, 23

[56] References Cited

U.S. PATENT DOCUMENTS

| | | | |
|---|---|---|---|
| 3,600,229 | 8/1971 | Torkildsen | 429/23 |
| 3,697,325 | 10/1972 | Baude | 429/23 |
| 4,555,452 | 11/1985 | Kahara et al. | |

FOREIGN PATENT DOCUMENTS

| | | |
|---|---|---|
| 1486405 | 6/1967 | France . |
| 1146563 | 4/1963 | Germany . |
| 3732234 | 4/1989 | Germany . |
| 3832471 | 3/1990 | Germany . |
| 4004896 | 8/1991 | Germany . |
| 4113049 | 12/1991 | Germany . |
| 1223941 | 3/1971 | United Kingdom . |

OTHER PUBLICATIONS

Elektrotechnische Zeitschrift—ETZ Bd. 101, Nr. 22, (Nov. 1980), Karl Strasser, "Kompakte Brennstoffzellen—. . .".

Fuel Cell Handbook, (Appleby et al.), Van Nostrand Reinhold, New York, 1989; pp. 1–7, 440–455 and 544–551 (month unknown).

Sounderdruck aus VDI Buch Nr. 0996, (1990), Brennstoffzellen, pp. 25–46, "Die alkalische Siemens-Brennstoffzelle in Kompaktbauweiss", (month unknown).

*Primary Examiner*—Anthony Skapars
*Attorney, Agent, or Firm*—Herbert L. Lerner; Laurence A. Greenberg

[57] ABSTRACT

In a method for adjusting the removal of inert gas from a fuel cell block having a number of fuel cells, a progressive rise in a proportion of inert gas results in a cathode-side or anode-side gas mixture flowing through the fuel cells. An inert-gas-rich gas mixture is drained out as a function of a voltage drop, and the voltage drop is measured between at least two immediately adjacent fuel cells. A fuel cell block includes a number of adjacent fuel cells having electrodes and gas chambers. At least one bipolar plate contacts the electrodes of adjacent fuel cells over a large area. Two spaced-apart contacts are disposed between at least two of the adjacent fuel cells on the at least one bipolar plate. A control element for a gas mixture leaving one of the gas chambers and having a high proportion of inert gas, is adjusted by a voltage drop picked up at the contacts.

15 Claims, 1 Drawing Sheet

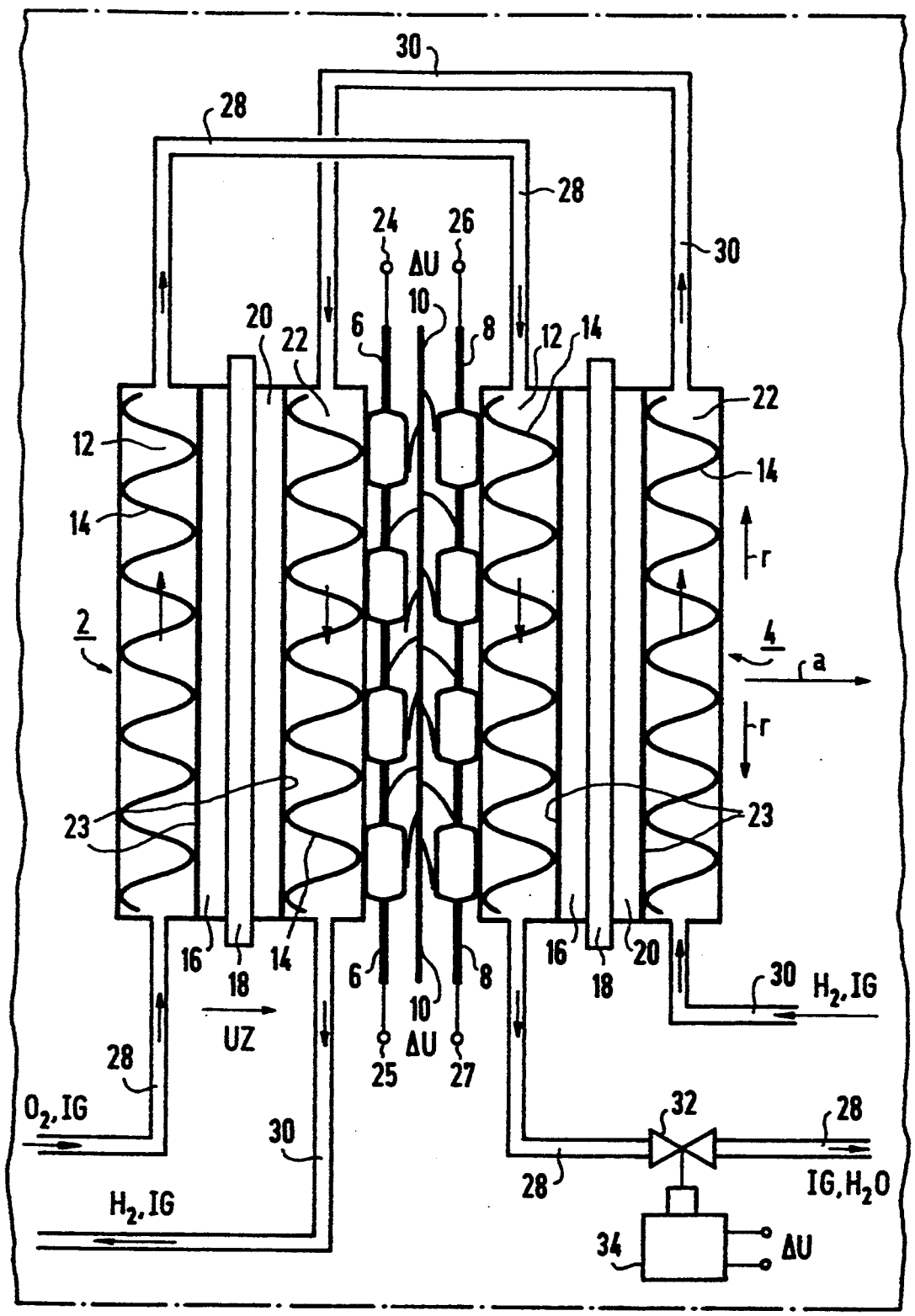

FUEL CELL BLOCK AND METHOD FOR ADJUSTING THE REMOVAL OF INERT GAS FROM THE FUEL CELL BLOCK

BACKGROUND OF THE INVENTION

Field of the Invention

The invention relates to a fuel cell block and a method for adjusting the removal of inert gas from a fuel cell block having a number of fuel cells, in which a progressive increase in a proportion of inert gas in a gas mixture flowing through the fuel cells on a cathode or anode side is brought about.

In general, a fuel cell includes an electrically conductive current transformer plate, a cathode, an ion-conducting intermediate layer, an anode, and a further electrically conducting current transformer plate, which are stacked on one another in that order in the form of flat plates and form an electrolyte-electrode unit. In the case of a PEM fuel cell, the electrolyte-electrode unit is also called a membrane electrode unit, wherein PEM stands for polymer electrolyte membrane, or proton exchange membrane.

Fuel cells of such a structure are known, among other sources, from the Fuel Cell Handbook by Appelby and Foulkes, New York, 1989, and by the article by K. Strasser, entitled "Die alkalische Siemens-Brennstoffzelle in Kompaktbauweise" [The Siemens Compact Alkaline Fuel Cell], VDI Manual No. 0996, 1990, pp. 25–46. Since the fuel cell is capable of converting chemically bound energy directly into electrical energy, it makes it possible for fuels such as hydrogen, natural gas and biogas to be converted into electrical energy at greater efficiency and with less environmental burden than the previously known conventional internal combustion engines, having an efficiency which is limited by the so-called Carnot process, were capable of doing.

A fuel cell block is made up of alternatingly stacked-together electrolyte-electrode units, gas chambers, cooling units and pressure cushions. Seals and possibly spacers are built-in between those individual components. The spacers may be constructed as bipolar plates with intervening spring plates. The various liquid and gas chambers of the block are supplied from axial channels through radial channels that extend through the seals. Such an axial channel extends at right angles to the plane of the stacked-together plate-like components of the fuel cell block. Such a radial channel extends correspondingly in the plane of the plates.

During operation of the fuel cell block, in particular with a block formed of PEM fuel cells, a problem arises, when the anode side is supplied with industrially pure water and the cathode side is supplied with industrially pure oxygen, which is that water, that is created in the fuel cells as a result of the electrochemical reaction of hydrogen and oxygen to make water, and inert gases such as nitrogen, carbon dioxide, and noble gases, which are contained in slight percentages as contaminants in industrially pure gases, must be removed from the fuel cells.

Heretofore, that problem was solved by regulating the inert gases as a function of the electric current and concentrating them in the flow direction of the gas mixture on the anode or cathode side. An unavoidable disadvantage which had to be tolerated was that major expense was needed for the circuitry on the high-current side. The high-current circuitry of such a fuel cell block is bulky, heavy and expensive, which argues against mass usage of the PEM fuel cell, for instance in electric vehicles.

SUMMARY OF THE INVENTION

It is accordingly an object of the invention to provide a fuel cell block and a method for adjusting the removal of inert gas from the fuel cell block, which overcomes the hereinafore-mentioned disadvantages of the heretofore-known devices and methods of this general type and which make it possible to carry out the removal of inert gas in a simple way while avoiding the above-mentioned disadvantages.

With the foregoing and other objects in view there is provided, in accordance with the invention, in a method for adjusting the removal of inert gas from a fuel cell block having a number of fuel cells, in which a progressive rise in a proportion of inert gas results in a cathode-side or anode-side gas mixture flowing through the fuel cells, the improvement which comprises draining out an inert-gas-rich gas mixture as a function of a voltage drop, and measuring the voltage drop between at least two immediately adjacent fuel cells.

With the objects of the invention in view, there is also provided a fuel cell block, comprising a number of adjacent fuel cells having electrodes and gas chambers; at least one bipolar plate putting the electrodes of adjacent fuel cells into contact over a large area; two spaced-apart contacts disposed between at least two of the adjacent fuel cells on the at least one bipolar plate; and a final control element for a gas mixture leaving one of the gas chambers and having a high proportion of inert gas, the final control element being adjusted by a voltage drop picked up at the contacts.

A result attained in this way is that if the reaction gas concentration varies along the flow path (concentration of the inert gas components and water), the resultant current density shift in the radial direction along the bipolar plate is utilized to adjust the inert gas removal. This current density shift is expressed by a current, flowing partly in the radial direction, between at least two adjacent fuel cells. This current, for instance, flows through the bipolar plate that is built-in between two electrically series-connected, successive fuel cells. The current flow in the radial direction produces an integral voltage drop above the plate in the axial direction, which can be measured in a simple way and with which an electrical signal can easily be derived for adjusting the final control element, by way of which the inert-gas-rich gas mixture is discharged from the fuel cell block.

In accordance with another feature of the invention, the contacts for measuring the voltage drop are disposed on the bipolar plate, and are spaced axially apart or axially and radially apart. In all of these cases, the voltage drop is measured in radial current paths in which a fraction of the total current, which because of the asymmetry of the current density distribution in the various fuel cells flows in the radial direction as a transverse current, also flows.

In accordance with a concomitant feature of the invention, the gas chambers on the anode and cathode sides of adjacent fuel cells communicate in such a way that the flow direction of the anode-side and of the cathode-side gas mixture is opposite in the gas chambers of adjacent fuel cells. Due to the opposed flow direction in two successive, electrically series-connected fuel cells, this construction is suitable for particularly sensitive adjustment of the removal of inert-gas-rich gas mixture, since in this embodiment the voltage drop can attain relatively high absolute values.

Other features which are considered as characteristic for the invention are set forth in the appended claims.

Although the invention is illustrated and described herein as embodied in a fuel cell block and a method for adjusting the removal of inert gas from the fuel cell block, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The figure is a fragmentary, diagrammatic and schematic circuit diagram of a portion of a fuel cell block with a device for adjusting inert gas removal.

DESCRIPTION OF THE PREFERRED EMBODIMENTS

Referring now to the single figure of the drawing in detail, there is seen a portion of a fuel cell block 1. In this fragmentary view, two fuel cells 2, 4 are shown, which are connected electrically in series through two bipolar plates 6, 8 and one spring plate 10 disposed between the bipolar plates 6, 8 and including a number of resilient contact tongues. Each fuel cell 2, 4 includes a cathode gas chamber 12 with spacers 14, a cathode 16, a polymer electrolyte membrane (PEM) 18, an anode 20, and an anode gas chamber 22 with spacers 14. The cathode 16 and the anode 20 each have a current transformer plate 23 which, for example, is a layer of carbon paper, on the side thereof facing away from the PEM 18. The PEM 18 may include polymer material that is available on the market under trademarks such as "NAFION 115", "NAFION 117", and "DOW XUS". Contacts 24, 25 and 26, 27 are respectively attached to the bipolar plates 6 and 8, and a voltage $\Delta U$ that drops between the fuel cells 2, 4 is measured at these contacts. In the exemplary embodiment shown, the voltage drop $\Delta U$ is picked up at the contacts 24, 26 which are spaced apart axially. Equally advantageously, the voltage drop $\Delta U$ may be picked up at the likewise axially spaced apart pair of contacts 25, 27, or at one of the two radially and axially spaced apart contact pairs 24, 27 and 25, 26. The axial direction is indicated by reference symbol a, and two radial directions are indicated by reference symbol r.

The cathode gas chambers 12 and the anode gas chambers 22 of the fuel cells 2, 4 each communicate with one another by means of its own respective line system 28 and 30, in such a way that the flow direction of a cathode-side gas mixture $O_2$, IG and an anode-side gas mixture $H_2$, IG in the gas chambers of each cell 2, 4 in each case is opposite that in the adjacent cells 2, 4. In the line system 28 on the outlet side of the cathode gas chamber 12 of the fuel cell 4, a valve 32 is built in as a final control element and is adjusted by means of an adjusting member 34. The voltage drop $\Delta U$ is used as a parameter for adjusting the valve 32 and is applied at an input of the adjusting member 34.

During operation of the fuel cell block 1, the delivery of the anode-side and cathode-side gas mixture $H_2$, IG; $O_2$, IG is advantageously brought about on opposite sides of the fuel cell block 1. In the illustrated portion of the fuel cell block 1, which by way of example includes a number n=70, of electrically series-connected fuel cells 2, 4, the fuel cell 2 in the case assumed herein is then the (n−1)th or next-to-last fuel cell, and the fuel cell 4 is the nth or last fuel cell of the fuel block 1.

This means that fresh anode-side gas mixture $H_2$, IG is supplied on the inlet side to the anode gas chamber 22 of the fuel cell 4 through the line system 30. In the exemplary embodiment, the gas mixture on the anode side is industrially pure hydrogen gas $H_2$, which also has a fraction of inert gas IG amounting to approximately 0.05 volume %. The gas mixture $O_2$, IG on the cathode side, which is delivered through the line system 28 on the inlet side of the cathode gas chamber 12 of the fuel cell 2, has already flowed through a number (n−2) of upstream fuel cells of the fuel cell block 1. As a consequence of the electrochemical reaction of hydrogen $H_2$ and oxygen $O_2$ to make water $H_2O$ in the fuel cells, the cathode-side gas mixture flowing into the cathode gas chamber 12 of the fuel cell 2, which was originally industrially pure oxygen gas $O_2$ with a component of inert gas IG of approximately 0.5 volume %, now has a considerable proportion of water $H_2O$ and inert gas IG because of the consumption of the oxygen $O_2$ in the preceding (n−2) fuel cells. As a result, in the cathode gas chambers 12 of the fuel cells 2, 4 a cathode-side gas mixture $O_2$, IG, $H_2O$ that is already highly enriched with inert gas IG has a counterpart in the anode gas chambers 22 of the fuel cells 2, 4 that is a virtually still-unconsumed anode-side gas mixture $H_2$, IG.

The gas consumption of the fuel cell 4 assures a steady gas flow in the cathode gas chamber 12 of the fuel cell 2 and a slight concentration of the inert gas component in the flow direction. With the valve 32 closed, the oxygen $O_2$ that is still left over is removed from the cathode-side gas mixture $O_2$, IG that flows into the cathode gas chamber 12 of the fuel cell 4. In the flow direction, the concentration of inert gas IG therefore rises to virtually 100% in the cathode gas chamber 12 of the fuel cell 4.

This fact dictates a shift in the electrical current density in the radial direction r, that is a decrease in the axial current densities in the flow direction of the cathode-side gas mixture. Due to the opposed flow directions in the gas chambers of the adjacent and electrically series-connected fuel cells 2, 4, the electric current generated by the fuel cells 2, 4 does not flow exclusively in the axial direction a but also partly in the radial direction r. This is expressed by the voltage drop $\Delta U$ between the fuel cells 2, 4, which is measured in this case in the manner indicated above the bipolar plates 6, 8 and the spring plate 10. As referred to a voltage UZ of the fuel cells 2, 4 of approximately 0.7V each, this voltage drop $\Delta U$ can amount to as much as 20% of the cell voltage UZ, if there is a high proportion of inert gas IG. Voltage drops $\Delta U$ in the range between 10 and 100 mV are typical. In principle, however, the voltage drop $\Delta U$ is adjustable within wide limits, which is achieved, for instance, by inserting additional, or differently shaped spring plates 10, or other intervening layers.

As a function of this voltage drop $\Delta U$, which rises with an increasing proportion of inert gas IG and water $H_2O$, or in other words as the consumption of the oxygen component $O_2$ increases, the valve 32 is adjusted or guided by means of the adjusting member 34. With the valve 32 open, an inert-gas-rich gas mixture (in this case on the cathode side) is discharged from the fuel cell block 1. The fraction of the cathode-side gas mixture discharged from the fuel cell block 1, which for the most part includes inert gases, that is inert gas IG and water $H_2O$, is replaced on the inlet side of the fuel cell block 1 by fresh cathode-side gas mixture $O_2$, IG, which in this case is industrially pure oxygen gas. With the valve 32 closed, the increase in the proportion of inert gas IG and water $H_2O$ progresses rapidly, because of the consumption of oxygen $O_2$.

Adjusting the valve 32 can be carried out in two ways. On one hand, the adjusting member 34 may be a regulator that adapts the degree of opening of the valve 32 directly to the difference between the voltage drop $\Delta U$ and a reference value. On the other hand, the adjusting member 34 may control the valve 32 in such a way that the valve 32 is opened after a predetermined threshold voltage of $\Delta U$ is exceeded, and is closed again after a defined gas quantity has passed through (after a defined opening time).

The layout for disposing of the inert gas IG and water $H_2O$ component of the cathode-side gas mixture, as is shown in the drawing, may also be installed in the same way on the first (n=1) and the second (n=2) fuel cell of the fuel cell block 1, in order to assure the disposal of the component of inert gas IG in the anode-side gas mixture $H_2$, IG.

In each case, the voltage-dependent adjustment of the water and inert gas disposal dispenses with the major expense that previously had to be incurred to achieve current-dependent regulation. The attendant savings for a fuel cell block 1 having an electrical capacity of 30 to 40 kW is approximately 10% of the production cost. This advantage gains special significance in a mass-scale application, such as in electrically driven vehicles. In addition to this cost economy, there is also considerable economy in terms of the volume and weight of circuitry devices.

In principle, the method for voltage-dependent adjustment of the water and inert gas disposal from a fuel cell block 1 is not limited to the employment of PEM fuel cells but can equally well be used with any other type of fuel cells, for instance in fuel cells with other electrolytes that conduct protons, hydroxide ions, or oxygen ions.

Advantages from the use of the method can also be attained if the fuel cell block 1 is modified, in accordance with the drawing, in such a way that the voltage $\Delta U$ dropping between at least two adjacent fuel cells is measured at a plurality of points within the fuel cell block 1, and if the valves 32 for draining out gas mixture containing inert gas are also provided at a plurality of points.

In the drawing, the delivery of the anode-side and cathode-side gas mixture takes place on opposite sides of the fuel cell block 1, in terms of the gas. The flow direction of the anode-side and cathode-side gas mixture is selected to be opposite, both inside the individual fuel cells 2, 4 and with respect to adjacent fuel cells. This represents the currently most highly preferred embodiment. Alternative embodiments are attained if:

a) the flow direction of the anode-side and of the cathode-side gas mixture is chosen to be the same within the individual fuel cells 2, 4 but opposite in terms of adjacent fuel cells 2, 4; or if b) the flow direction of the anode-side and the cathode-side gas mixture within the individual fuel cells 2, 4 is chosen to be opposite, but is chosen to be in the same direction with respect to adjacent fuel cells 2, 4; or if c) both within the individual fuel cells 2, 4 and with respect to adjacent fuel cells 2, 4, the flow direction of the anode-side and cathode-side gas mixture is chosen to be the same.

We claim:

1. In a method for adjusting the removal of inert gas from a fuel cell block having a number of fuel cells, in which a progressive rise in a proportion of inert gas results in a cathode-side or anode-side gas mixture flowing through the fuel cells, the improvement which comprises:

draining out an inert-gas-rich gas mixture as a function of a voltage drop, and measuring the voltage drop between at least two immediately adjacent fuel cells.

2. The method according to claim 1, which comprises measuring the voltage drop of two of the fuel cells located at least at one of a beginning and an end of the fuel cell block.

3. The method according to claim 1, which comprises directing the flow through two anode gas chambers and two cathode gas chambers of two immediately adjacently disposed fuel cells in opposite directions, and directing a flow through the gas chambers of each fuel cell in opposite directions.

4. A fuel cell block, comprising:
a number of adjacent fuel cells having electrodes and gas chambers;
at least one bipolar plate contacting said electrodes of adjacent fuel cells over a large area;
two spaced-apart contacts disposed between at least two of said adjacent fuel cells on said at least one bipolar plate; and
a control element for a gas mixture leaving one of said gas chambers and having a high proportion of inert gas, said control element being adjusted by a voltage drop picked up at said contacts.

5. The fuel cell block according to claim 4, wherein said at least one bipolar plate is two bipolar plates being in electrical contact with one another and being disposed between two of said fuel cells.

6. The fuel cell block according to claim 5, including a spring plate electrically conductively connecting said two bipolar plates.

7. The fuel cell block according to claim 4, wherein said contacts are axially spaced apart between two of said fuel cells.

8. The fuel cell block according to claim 4, wherein said contacts are axially and radially spaced apart between two of said fuel cells.

9. The fuel cell block according to claim 4, wherein said gas chambers of all of said fuel cells include a gas chamber disposed last as seen in flow direction of the gas mixture, and said control element has an outlet side connected to said last gas chamber.

10. The fuel cell block according to claim 4, wherein said gas chambers of said fuel cells between which the voltage drop is picked up include a gas chamber disposed last as seen in flow direction of the gas mixture, and said control element has an outlet side connected to said last gas chamber.

11. The fuel cell block according to claim 4, wherein said anode and cathode gas chambers of adjacent fuel cells communicate for directing the anode-side and the cathode-side gas mixture in opposite directions in said gas chambers of said adjacent fuel cells.

12. The fuel cell block according to claim 4, wherein a flow direction of the anode-side and the cathode-side gas mixtures is the same in said gas chambers of said adjacent fuel cells.

13. The fuel cell block according to claim 4, wherein a flow direction of the anode-side and the cathode-side gas mixtures in each of said fuel cells is opposite.

14. The fuel cell block according to claim 4, wherein a flow direction of the anode-side and the cathode-side gas mixtures in said gas chambers of each of said fuel cells is opposite.

15. The fuel cell block according to claim 4, including gas supply lines for the anode-side and the cathode-side gas mixtures, connecting said fuel cells in series on the gas side and introducing one of the gas mixtures from one side and the other of the gas mixtures from the other side.

* * * * *